US012622364B2

(12) United States Patent
Massey et al.

(10) Patent No.: US 12,622,364 B2
(45) Date of Patent: May 12, 2026

(54) SEED CARTRIDGE ASSEMBLY FOR ENCLOSED GROWING ENVIRONMENT

(71) Applicant: Heliponix, LLC, Evansville, IN (US)

(72) Inventors: Scott Thomas Massey, Evansville, IN (US); Ivan Lee Ball, Owensville, IN (US)

(73) Assignee: Heliponix, LLC, Evansville, IN (US)

( * ) Notice: Subject to any disclaimer, the term of this patent is extended or adjusted under 35 U.S.C. 154(b) by 36 days.

(21) Appl. No.: 18/691,667

(22) PCT Filed: Sep. 20, 2022

(86) PCT No.: PCT/US2022/044097
§ 371 (c)(1),
(2) Date: Mar. 13, 2024

(87) PCT Pub. No.: WO2023/049103
PCT Pub. Date: Mar. 30, 2023

(65) Prior Publication Data
US 2024/0389521 A1      Nov. 28, 2024

Related U.S. Application Data

(60) Provisional application No. 63/261,446, filed on Sep. 21, 2021.

(51) Int. Cl.
*A01G 9/02* (2018.01)
*A01G 9/00* (2018.01)
(Continued)

(52) U.S. Cl.
CPC ........... *A01G 9/0293* (2018.02); *A01G 9/006* (2013.01); *A01G 9/023* (2013.01); *A01G 9/247* (2013.01);
(Continued)

(58) Field of Classification Search
CPC ...... A01G 9/0293; A01G 9/023; A01G 9/247; A01G 9/249; A01G 9/006; A01G 31/06; A01G 31/047
See application file for complete search history.

(56) References Cited

U.S. PATENT DOCUMENTS

| | | | | |
|---|---|---|---|---|
| 10,477,786 B1 * | 11/2019 | Wilson | .................. | A01G 9/042 |
| 11,206,774 B2 * | 12/2021 | Sperry | .................. | A01G 31/06 |

(Continued)

FOREIGN PATENT DOCUMENTS

| | | | | |
|---|---|---|---|---|
| WO | WO-2013096849 A1 * | 6/2013 | ............. | A01G 24/25 |
| WO | WO2021141968 A1 | 7/2021 | | |
| WO | WO-2022029032 A1 * | 2/2022 | ............. | A01G 13/28 |

OTHER PUBLICATIONS

Office Action for European Application No. 22786662.1, Dated Feb. 12, 2025, 9 pages.

(Continued)

*Primary Examiner* — Monica L Perry
*Assistant Examiner* — Aaron M Rodziwicz
(74) *Attorney, Agent, or Firm* — Lee & Hayes, P.C.

(57) ABSTRACT

A seed cartridge configured for indoor growing appliances. The seed cartridge is a self-contained apparatus having a structure that contain one or more seeds suspended in one or more layers of substrate. The structure of the seed cartridge includes a removable top surface, a bottom surface, and a side surface. The side surface is substantially coned shaped to provide a larger top surface when compared with the bottom surface and include one or more openings, holes, or slits along the exterior side surface to allow water to be delivered from the indoor growing appliances to the seeds.

20 Claims, 18 Drawing Sheets

(51) Int. Cl.
| | |
|---|---|
| *A01G 9/029* | (2018.01) |
| *A01G 9/24* | (2006.01) |
| *A01G 31/04* | (2006.01) |
| *A01G 31/06* | (2006.01) |

(52) U.S. Cl.
CPC ........... *A01G 9/249* (2019.05); *A01G 31/047* (2013.01); *A01G 31/06* (2013.01)

(56) References Cited

U.S. PATENT DOCUMENTS

| | | | | |
|---|---|---|---|---|
| 2013/0160361 A1* | 6/2013 | Keithly | .................. | A01G 24/28 |
| | | | | 47/65.5 |
| 2013/0180173 A1* | 7/2013 | Caspar | ................. | A01G 9/0293 |
| | | | | 47/65.7 |
| 2015/0156973 A1* | 6/2015 | Prinster | ................. | A01G 9/021 |
| | | | | 47/65.7 |
| 2016/0262320 A1* | 9/2016 | Ruys | ..................... | A01G 9/0293 |
| 2019/0116719 A1* | 4/2019 | Fletcher | ................... | B64D 1/16 |
| 2023/0084525 A1* | 3/2023 | Massey | ................. | A01G 31/06 |
| | | | | 47/60 |
| 2023/0180673 A1* | 6/2023 | Jackson | ................. | A01G 31/02 |
| | | | | 47/62 R |
| 2024/0122130 A1* | 4/2024 | Kuhns | ................. | A01G 9/0297 |
| 2024/0373795 A1* | 11/2024 | Johansson | ............ | A01G 9/0295 |

OTHER PUBLICATIONS

The PCT Search Report and Written Opinion mailed Dec. 9, 2022 for PCT application No. PCT/US2022/044097, 15 pages.
Office Action for European Application No. 22786662.1, Dated Jun. 16, 2025, 8 pages.

\* cited by examiner

100

112

108

104

106

118

110

102

128

120

116

114    126

100

302

206

206

204

1412

1412

1412

1412

400

1400

1500

1600

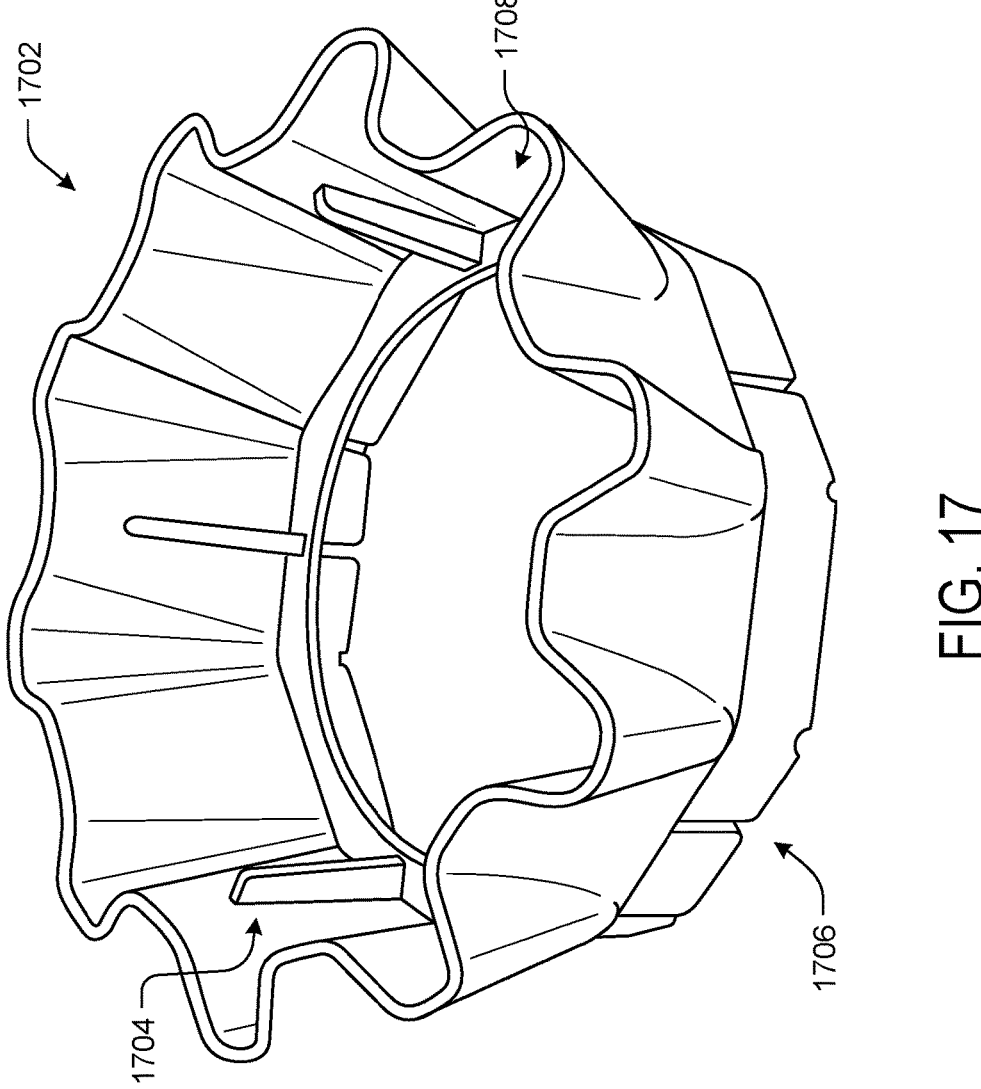
FIG. 17

1800

1802

400

1702

400

1702

SEED CARTRIDGE ASSEMBLY FOR ENCLOSED GROWING ENVIRONMENT

CROSS-REFERENCE TO RELATED APPLICATIONS

This application is a U.S. national stage application under 35 USC § 371 of International Application No. PCT/US22/44097 filed on Sep. 20, 2022 and entitled "SEED CARTRIDGE ASSEMBLY FOR ENCLOSED GROWING ENVIRONMENT," which claims priority to U.S. Provisional Application No. 63/261,446, filed on Sep. 21, 2021 and entitled "SEED CARTRIDGE ASSEMBLY FOR ENCLOSED GROWING ENVIRONMENT," the entire contents of which are incorporated herein by reference.

BACKGROUND

Home gardening and usage of micro gardens in the apartment complexes and neighborhoods has grown in recent years throughout the United States in response to food deserts limiting the availability of fresh produce in densely populated areas. More consumers desire to have fresh produce and herbs grown at home to provide fresher produce, as well as to limit the preservatives and chemicals used in large grocery stores. Depending on climate, homeowners may be limited to indoor systems for growing fresh produce and herbs. However, most indoor systems are limited in space and provide unitary growing conditions for all produce and herbs that often results in suboptimal conditions for all produce and herbs being produced by the homeowner. Additionally, homeowners often lack the education and time to properly maintain optimal growth conditions for each individual species and type of plant.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 17 illustrates example pictorial diagrams of a ring or row of a planting column that may be utilized with the enclosed growing environment or as standalone system according to some implementations.

Figure 1:
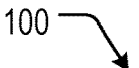
FIG. 1 is an example pictorial diagram of an enclosed growing environment or appliance in a closed configuration according to some implementations.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Discussed herein are systems and methods associated with automating, optimizing, and customizing at home enclosed growing appliances (such as a micro garden) or plant growing apparatuses for individual users. For example, the systems, discussed herein, may be configured to provide an enclosed growing environment for at home and indoor cultivation of plants (e.g., fungi, flowers, produce, mushrooms, herbs, and/or the like). The system may, in some implementations, provide an isolated enclosure that is configured to provide stable and controlled environmental conditions, physically separated from the conditions within a surrounding environment (e.g., the home or apartment).

In some examples, the enclosed growing environment may be configured with a planting column or tower configured to receive one or more seed containers via one or more receptacles, receiving slots, or cavities. For example, the planting column may comprise a plurality of receptacles configured to receive individual seed cartridges or pods. The planting receptacles may be arranged both in vertical columns and horizontal rows about the planting column. For instance, in one specific example, the planting column may include twenty columns and five rows of planting receptacles. In some cases, the planting receptacles may be staggered between the columns, such that each column has one planting slot for every other row. In these cases, staggering the planting receptacles allows the system to be able to monitor each individual plant as well as allowing each individual plant sufficient room to grow.

In some cases, the planting column may be rotatable three-hundred and sixty degrees within the enclosure and about a base, or any other limited rotation. For example, a drive motor may be configured to mechanically or magnetically rotate the planting column within the enclosure based on one or more control signals from a monitoring and control system. In some instances, as the planting column rotates, each individual planting slot may be assigned a unique identifier, such that the system is able to track each seed cartridge and resulting plant based on a determined location within the planting column. The planting column may also be coupled to a water reservoir that is configured to provide water to the seed cartridge on, for example, an individualized basis. In some examples, a gasket may be positioned between rings that have connected lid flaps that close over the planting receptacles or ports. The top, side, and even the bottom sides of the lid flaps may have unique identifiers for a vision system to recognize planting locations, as discussed herein.

In some examples, the seed cartridge may be specifically designed to mate and/or otherwise be received within a cavity defined by the slot of the planting column. The seed cartridges may be a self-contained apparatus having an exterior structure of one or more surfaces or walls that contain one or more seeds suspended in one or more layers of substrate or growing medium. For example, in some cases, the substrate or medium may include a first or bottom layer of fertilizer (such as slow release fertilizer prills). A second layer over the fertilizer that is composed of an open cell polyurethane foam (e.g., a compostable polyurethane foam). In some cases, the second layer may be included to separate the seeds from the fertilizer prills, wick water upwards to seeds, provide a foundation for root growth, and drain water downwards, so the cartridge does not become oversaturated and generate undesirable anaerobic/aerobic microbial growth. Additionally, the second layer may prevent root burn and/or damage from the higher concentrations of nitrates in the fertilizer prills. In some instances, the second layer may be a single solid media to prevent the seeds from becoming translocated throughout the substrate during transport and, thereby, not growing out top of the cartridge as desired. As an alternative example, the second layer may be a PLA fiber growing media. In some instances, the media of the second layer is dark colored or black so as to not reflect light and thereby prevent algae growth.

In some cases, the seeds may be positioned, as a third layer, above the second layer. The seeds may be suspended in a foam or other solid and compostable media plug. In some cases, the plug may be thermally and/or mechanically formed inserts having a size to match the size of the seeds. A fourth layer may be positioned above the seed layer and/or third layer. The fourth layer may include a loose growing media placed over the seeds. The growing media may be loose for the seedlings to grow through as the foliage cannot pass through a solid or tightly packed media. In some cases, the loose growing media may include paper fiber. The paper fiber may be configured to become saturated and retain moisture to ensure good germination rates of the seeds.

In some examples, the seed cartridge may include a removable top surface, a bottom surface parallel to the top surface, and a side wall or surface. For example, the top surface may be peelable or otherwise removable such that during transport and handling the top surface may act as a lid to maintain the substrate, seeds, and/or other medium within the cartridge. The top surface may then include a tap or extended portion that may be gripped, by for instance a user inserting the cartridge into the planting column, and then separated, peeled, or otherwise removed from the cartridge to allow the plant to sprout from and extend upward from the substrate within the cartridge. The lid may be partially sealed permanently and partially sealed temporarily, so that the lid (with the plant identifier) remains partially attached to the seed pod cup even if a significant portion of the was opened to allow for plant growth.

In some cases, the tap or extended portion may include at least two flat sides or portions, such that the seed cartridge does not roll, experience longitudinal rotation, or otherwise slide on flat surfaces, such a table or counter, or during transport and shipping. For instance, in one example, the tab may be formed in a substantially triangular shape in which the apex of the triangle is extended from the base which couples to the exterior side surface.

In some examples, the side surface may be substantially coned shaped to provide a larger top surface when compared with the bottom surface. However, it should be understood that the exterior surface of the seed cartridge may take various forms and/or shapes, such as substantially rectangular prisms, substantially triangular prisms, substantially pyramidal, and the like.

The seed cartridge may include one or more openings, holes, or slits along the exterior side surface to allow water to be delivered from the planting column to the seeds and/or substrate within the seed cartridges. The slits may be arranged in columns along the side surface and the columns may extend substantially the entire width of the exterior side surface, such that the slits are located along substantially the entire width of the cartridge. In some examples, the size of the slits may vary in size or length (as measured from the top surface to the bottom surface of the cartridge) with respect to each other. For instance, lower slits may be both longer relative to higher slits as well as closer together (e.g., the distance between the slits is reduced). In some cases, the columns of slits may also become closer to each other (e.g., the horizontal or width wise gaps between the slits may be reduced) as the slits approach the bottom surface (e.g., slits proximate to the bottom surface are closer horizontally and vertically to other slits than slits proximate to the top surface). In some examples, the slits may continue along the bottom surface of the seed cartridge. For example, the lowest slit in each column may partially extend into the bottom surface of the seed cartridge to provide improved drainage during use.

In this manner, the slits concentrically approach near, or at the center of the cartridge as the slits approach the bottom surface of the cartridge. The concentrically designed slits improve upon other traditional seed delivery containers by comparatively directing root growth downwards and increasing the plants and seeds access to water and nutrients contained in the lower sections of the cartridge. Additionally, the concentrically designed slits of the seed cartridge provide for easier manufacturing and, in particular, injection modeling of the cartridges. In some examples, the slits may be configured with rounded corners and the corners may be equipped with filets to add structural integrity to the carriage during use and to assist with the flow of the liquid polymer or other material that is injected into a mold during manufacturing.

In some cases, one or more components of the seed cartridge may be compostable. For instance, the top surface may be formed of paper, cardboard, or other compostable material. In some cases, the top surface may be thermal and/or sonic welded, pressure sealed, adhered, or otherwise adhered to the exterior side surface. In one specific example, the entire seed cartridge including the top surface, side surface, and bottom surface, seeds, and substrate may be compositable. For instance, the seed cartridge exterior may be formed from polylactic acid (PLA), polybutylene succinate (PBS), polyhyroxyalkanoates (PHA), a combination thereof, or a derivative of any of these materials as well as other compostable or biodegradable materials and the like.

Figure 10:
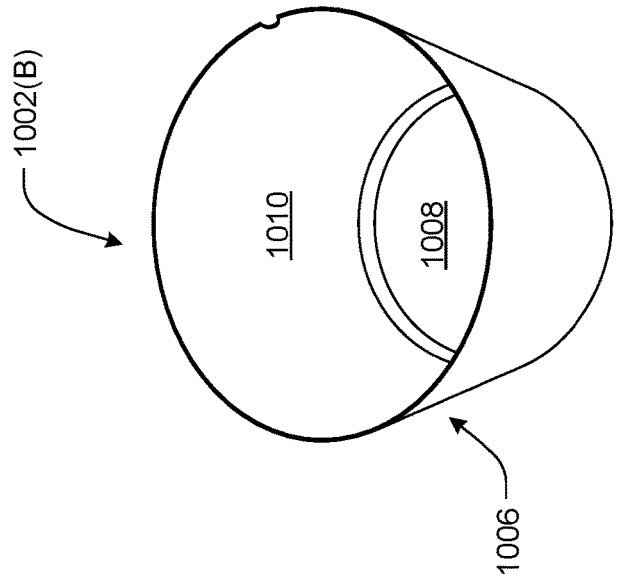
FIG. 10 is an example pictorial diagram of filters for the interior of the seed cartridges according to some implementations.
Figure 10:
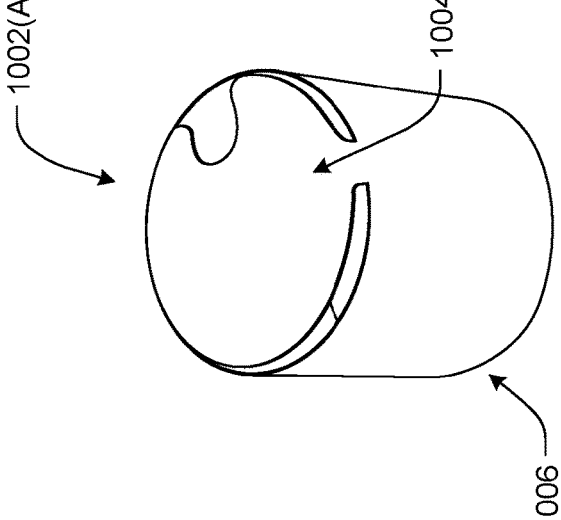

In some cases, a removable and/or fixed filter may be positioned between the exterior surface and the substrate within the cartridge to assist with maintaining the substrate, seeds, and/or other medium within the cartridge during use. In some examples, the filter may be a non-woven PLA that is placed inside of the injection mold prior to injecting the liquid polymer. The non-woven PLA filter provides resistance for root expansion and directs root growth downwards, such that the root mass is largely contained within the cartridge to reduce excessive root formation out of the slits and, thereby, in the drainage tube or other areas of the growing system of the enclosed growing environment. The filter may be cone shaped or a combined cone and circle shape making a cup shape, as shown in FIG. 10. Alternatively, the filter may be a longer cone component that is sealed at the narrow end to close the filter before being placed inside the injection mold. However, it should be understood that other types of material may be used as a filter and that the filter is not exclusive to the material selection of PLA or to a non-woven material.

In some examples, one or more of the surfaces of the seed cartridge may be marked with information related to the characteristics of the seed cartridge. For instance, the markings may include plant identifiers as well as location of origin of the cartridge and/or the seeds, substrate, and the like associated therewith, fertilizer and/or substrate formulas, type of seeds (e.g., types of resulting plants species and any subspecies), number of seeds, media or substrate related data (e.g., manufacture, supplier, layers, layer make up, amount(s), and the like), compostability data, safety data (e.g., allergies and the like), certifications, lot number, dates (e.g., dates of manufacturing, production, seed and/or substrate packing, expiration, shipping, and the like), among others.

In some cases, the markings may include a word such as plant type (e.g., basil) and the words may have specific characteristics such as font height, width, type weight, color, and the like that may be utilized by pattern recognition and computer vision techniques to identify and access the data associated with the markings (e.g., the font and the like). In this manner, as there are many types of basil and limited surface space on the cartridge, the enclosed growing environment may utilize sensor to capture data (e.g., image data) of the word "basil" and then access cloud based services and/or stored data (such as subspecies) to determine additional information related to the particular subspecies of basil and the other cartridge related data discussed above. In some cases, in addition to the font and word, the cartridge may include a graphic, icon, pattern, and the like that may be detected using pattern recognition and computer vision techniques together with cloud based services and/or datastores to supplement the data printed on the cartridge itself.

In some examples, the markings may include a hidden (such as an infrared marking) and/or visible portion(s). For example, the visible portion may be used by a user to identify the plant and the hidden portion may be usable by the vision system of the appliance or via a manufacturer. In some cases, the hidden and visible portions may be along the same surface of the lid. However, in other examples, the hidden portion and the visible portion may be along different surfaces (e.g., a top and bottom surface) of the lid. For instance, the visible portion may be along a top surface visible when the lid is in the closed potion and the hidden portion may be visible when the lid is in the open position. In one example, the hidden portion may include an infrared or other machine readable but human unreadable spectrum on both the top surface and the bottom surface of the lid. For instance, the hidden portion may include a bar code, QR code, or other machine readable content.

In some cases, the markings (e.g., the hidden portion and/or visible portion) may be machine readable (such as via a barcode, QR code, RFID, NFC, or the like). In other cases, the markings may be configured to be readable using infrared (IR) or ultraviolet (UV) illumination, such that the information is invisible to a user under normal visible light conditions. In this example, the enclosed growing environment may be equipped with IR sensors and/or illuminators to extract the data associated with the markings.

RFID and/or NFC wireless communication technology may be applied to the lid of the seed cartridge for machine readability via external readers or sensors located on the appliance, NFC readers on mobile devices, or to utilize ambient electromagnetic radiation to power and communicate with other wireless devices. One example of this functionality is to allow a user to interact with the seed cartridges using a mobile application on a user electronic device to identify the plant type, manufacturing details, unique identification, origin of assembly, verification of authenticity, or any other type of information that can be stored into the memory of the wireless technology.

Accordingly, a vision system of the enclosure may utilize the markings on the seed cartridges and/or lid to at least assist in categorizing, classifying, segmenting, defining an area, region or location associated with the plant based at least in part on image data of the plant and the lid. In some case, the appliance may also utilize the identifier to access growth conditions, settings, and/or parameters customizable for the associated plant at one or more life stages. As an illustrative example, the seed cartridges may include markings that cause the enclosed growing environment to access a cloud-based series and/or datastore that contains the seed cartridge data, such as via blockchain, unique identifiers, hash codes, third party APIs, and the like. In some cases, the seed cartridge data may be made accessible to an owner or user of the enclosed growing environments via mobile application or cloud-hosted portal/website.

In some cases, the seed cartridge may be formed with a particular pattern and/or color scheme that corresponds to the cartridge data as discussed above. In this example, the enclosed growing environment may capture sensor data (e.g., image data) of the cartridge as the cartridge is inserted and utilize the patterns and/or color together with a cloud-based service/datastore and/or third party system to determine the cartridge data. In some cases, the color and/or pattern may be applied to the entire lid face and/or exterior side surface of the seed cartridge. In other cases, the color and/or pattern may be applied to the top surface, such as the corner provided for the user to grip and remove the top surface after insertion into the planting column. In some cases, the color and/or pattern may be applied using printing, ink, laser, etching, embossing, and the like.

In one specific example, the color or pattern may be used to indicate a location or region associated with the planting column in which to plant or insert the seed cartridge. For example, different regions of the planting column may be configured to provide customized growing conditions for specific types of plants. In this manner, the color or pattern may correspond to a specific region of the planting column designed to provide the customized growing conditions for the plant species and/or subspecies within the corresponding seed cartridge. In some examples, the pattern and/or color may be replicated on the planting column to reduce complexity with respect to placement of the seed cartridge. In one specific example, illuminators associated with the enclosed growing environment may be activated in response to detection or indication of a planting or insertion event to illuminate the desired region or regions in for instance a corresponding color or pattern.

In addition to the enclosed growing environment discussed above, the seed cartridges may also be configured to mate or engage with a set of stackable rings that form a planting column, such as the planting column within the enclosed growing environment. In some cases, the planting column formed by the set of stackable rings may include one or more rings (such as between one and ten rings) that are configured to mate one atop the next in a manner to provide alternating receptacles for receiving the seed cartridges. In some cases, each ring may be configured to be identical to the others and include a male connector (e.g., protrusions) and a female connector (e.g., openings) that are offset from each other such that when the rings are engaged with each other the planting receptacles or offset from the row or ring directly above and directly below (e.g., the rings are staggered with respect to each other). In this manner, the planting column formed from the set of rings may provide sufficient space for each plant to grow to maturity. In some cases, a ring shaped gasket may be positioned between the adjacent pairs of rings. The gasket may be a rubber, plastic, or other material to reduce slide between the pairs of adjacent rings.

In some cases, the rings may be formed from polymers or plastics, such as, for example, Acrylonitrile Butadiene Styrene (ABS), polyethylene (PE), Polyvinyl Chloride (PVC), High Impact Polystyrene Sheet (HIPS), High Density Polyethylene (HDPE), Low density polyethylene (LDPE), Thermoplastic Polyurethanes (TPU), Thermoplastic elastomers (TPE), Polypropylene (PP), Polystyrene (PS), or the like and may also include copper or silver based anti-microbial additives and/or ultraviolet (UV) stabilizers. In some cases, the rings may be lightweight (e.g., less than a weight threshold, such as 0.25 pounds, 1 pound, 2 pounds, or the like) so that the rings can easily be moved with or without associated plants. For example, the rings may be de-stacked and moved (such as over a sink during watering). In some cases, the ring may have a diameter of between approximately six inches and nine inches.

Figure 2:
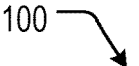
FIG. 2 is an example pictorial diagram of an enclosed growing environment or appliance in an open configuration according to some implementations.

FIGS. 1 and 2 illustrate example views of an enclosed growing environment 100 for providing a controlled growing environment according to some implementations. The enclosed growing environment 100 may be configured as a plant growing apparatus or appliance that provides a climate-controlled interior that houses at least one plant housing assembly or planting column 204. However, unlike conventional home garden systems that provide uniform lighting and temperature, the enclosed growing environment 100 may provide active monitoring and adaptive environmental conditions based on the health, stage of growth, type or species of plants, and the like via one or more systems either internal to the enclosed growing environment 100, co-located within a physical environment, such as the home, or a remote cloud-based systems.

The enclosed growing environment 100 may have one or more panel(s) 104 that surround the interior 202. In the nonexclusive embodiment of FIG. 1, the enclosed growing environment 100 may be substantially rectangular in shape and have panels 102, such as a first and second side panel 104, 106, a back panel 108, a front panel 110, a top panel 112, and a bottom panel 114. While a rectangular enclosed growing environment 100 is illustrated, this disclosure is not limited to such a configuration. Rather, any three-dimensional geometric shape may be used to separate the interior 202 from a surrounding environment 116. More specifically, the enclosed growing environment 100 may have a cylindrical, hexagonal, octagonal, triangular, or the like cross-section and this disclosure considers any shape of the enclosed growing environment 100.

The enclosed growing environment 100 may be sized and shaped to fit in a standard residential kitchen or the like area. Further still, the growing apparatus 100 may be sized and shaped to fit in industrial commercial applications such as warehouses and restaurants, among others. For example, in one non-exclusive embodiment the enclosed growing environment 100 is sized to fit into a standard base cabinet opening wherein the enclosed growing environment 100 can be positioned under a countertop. Further still other configurations considered herein may be sized and shaped like a standard refrigerator or the like, wherein the enclosed growing environment 100 may occupy a similar space as a standard sized refrigerator. Further still, the teachings of this disclosure can be implemented in larger structures like buildings. In this embodiment, the enclosed growing environment 100 may be an entire building, wall(s) of a building, or the interior 202 may be the inside of the building. In yet another example, a shipping container could be repurposed with a plant housing positioned therein to make a modular hydroponic farm that can be easily transported. Accordingly, this disclosure considers implementing many different dimensions for the enclosed growing environment 100.

In some cases, the front panels 112 may include a door 118 and a drawer 120. The door 118 may be rotationally coupled to the remaining components of the enclosed growing environment 100. Accordingly, the door 118 may rotate between a closed position as illustrated in FIG. 1 and an opened position. In the closed position, the door 118 and remaining panels 102 may substantially isolate the interior 202 from the surrounding environment 116. Alternatively, in the opened position, the door 118 may allow a user to access the interior region 202 from the surrounding environment 116.

In one non-exclusive example, one or more of the panels 102 or any other panel having a surface facing the interior 202 may have a reflective material at least partially along the interior surface. Further, one or more LEDs or other light source may be embedded in or on the panel or panels that can selectively provide supplemental intracanopy lighting. In this embodiment, the panel or panels may use a semi, or highly reflective mirror surface to recycle light back to the interior 202 to promote plant growth. Further, the LEDs may selectively adjust an angle of illumination, intensity, intensity, position, temperature, and/or spectra based on a rotation position of the plant housing assembly 204. In this embodiment, the LEDs may also be evenly spaced to act as a passive heat sink to facilitate cooling the LEDs during use.

LEDs may also be positioned in the corner(s) of the interior 202 or along one or more lighting columns 210 and one or more of the LEDs discussed herein may be selectively controlled to simulate rotation of the planting tower 204 through oscillating brightness of the LEDs. Oscillating the LEDs may promote accelerated growth rates among other things. In another embodiment, the LEDs may be flat panels mounted onto the walls, ceilings, and/or the floor for homogenous lighting from all sides.

In some implementations, the lighting and control columns 210 may be configured within the enclosed growing environment 100 or along a specific region of the enclosed growing environment 100. The lighting and control columns 210 may be equipped with various sensors for monitoring the individual plants in addition to the one or more illuminators. For example, the lighting and control column 210 may be equipped with one or more sensors, such as image devices (e.g., red-green-blue image devices, infrared image devices, monochrome image devices, lidar devices, and the like), humidity sensors, temperature sensors, air pressure sensors, air quality/particulate sensors, gas sensors, carbon dioxide ($CO_2$) sensors, spectral sensors, and the like to generate sensor data 118 associated with the interior of the enclosed growing environment 100.

The lighting and control column 210 may also be equipped with one or more illuminators (such as visible lights, infrared illuminators, ultraviolet lights, and the like). The illuminators may be adjustable to provide specific spectrums, amounts of light, and intensities of light to each individual planting receptacle based on the corresponding plant's health, life stage, size, and type or species. In some cases, the lighting and control column 210 may also include multiple rows or columns of sensors and/or illuminators. For example, the lighting and control column 210 may include a row or column of sensors and/or illuminators for each corresponding row or column of plants.

In yet another aspect of this disclosure, any portion of the panels directed towards the interior region 202 may have a reflective material to ensure any plants positioned in the planting column 204 intake the majority of the photons of light emitted. This configuration may maximize the photosynthetic potential of the energy provided by the grow lights. More specifically, the surfaces of the panels facing the interior region may have a high-gloss white or reflective material thereon. The white or reflective material could reflect any light that does not land on the leaves of plants in the planting column 204 back to the plants to prevent wasted light energy.

In yet another aspect of this disclosure, the interior 202 may be substantially sealed from the surrounding environment to allow the humidity and pressure of the interior 202 to be selectively controlled. Low humidity environments may hinder plant growth by drying out the stomata which are required to be open for the gaseous exchanges needed in photosynthesis. Accordingly, one aspect of this disclosure utilizes a sealed, positively pressurized interior 202 to provide the dual benefit of preventing the entry of pests into the interior 202 and maintaining the optimal humidity for photosynthesis. In other words, the humidity and/or pressure of the interior 202 may be selectively controlled to ensure optimal plant growing conditions therein. Further still, carbon dioxide levels of the interior may be monitored and modified to provide improved growing conditions.

In some implementations, the planting column or tower 204 within the enclosed growing environment 100 may comprise a plurality of receptacles, generally indicated by 206, configured to receive individual seed cartridges, as discussed below with respect to FIGS. 4-13 and, accordingly, the cultivation of corresponding plants. The planting receptacles 206 may be arranged both in vertical columns and horizontal rows about the planting column 204. For instance, in one specific example, the planting column 204 may include twenty columns and five rows of planting receptacles. In some cases, the planting receptacles 206 may be staggered between the columns, such at each column has one planting receptacle for every other row. In these cases, staggering the planting receptacles 206 allows the enclosed growing environment 100 to provide each individual plant sufficient room to grow.

In some cases, the planting column 204 may be rotatable three-hundred and sixty degrees within the enclosed growing environment 100 and about a base 208, or any other limited rotation. For example, a drive motor (not shown) may be configured to mechanically or magnetically rotate the planting column 206 within the enclosed growing environment 100 based on one or more control signals or setting data, such as, in some examples, from a cloud-based system or, in other examples, via internal control system. In some instances, as the planting column 204 rotates, each individual planting receptacle 206 may be assigned a unique identifier, such that the enclosed growing environment 100 is able to track, via the sensors and/or illuminators of the lighting and control columns 210, each plant based on a determined location within the planting column 204 (e.g., an induvial planting receptacle 206).

Figure 18:
FIG. 18 illustrates another example pictorial diagrams of a planting column and seed cartridges that may be utilized with the enclosed growing environment or as standalone system according to some implementations.

In some cases, the planting column 204 may be formed by a set of stackable rings, as discussed in more detail with respect to FIGS. 18 and 19. In these cases, each ring may be one row of the planting column 204 and may include a plurality of receptacles 206 for receiving the seed cartridges, as discussed herein. The planting rings may be configured to mate and stack on top of a prior ring such that the planting receptacles are offset or staggered as the column is constructed. For example, the ring may include openings along the bottom portion of the ring as well as grooves that extend inward from the ring, such that the grooves of a lower ring mate with the openings of the upper ring. The grooves and openings are defined such that the staggered arrangement is maintained as the planting column is constructed.

Figure 3:
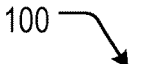
FIG. 3 illustrates an example front view of a planting column associated with the enclosed growing environment according to some implementations.

FIG. 3 illustrates an example front view of a planting column 204 associated with the enclosed growing environment 100 according to some implementations. In the illustrated example, the planting column 204 may comprise a plurality of receptacles 206 configured to receive seed cartridges for the cultivation of individual plants, generally indicated by 302. The planting receptacles 206 may be arranged both in vertical columns and horizontal rows (such as rings) about the planting column 204. For instance, in one specific example, the planting column 204 may include twenty columns and five rows (or rings) of planting receptacles 206. In some cases, the planting receptacle(s) 206 may be staggered between the columns, such that each column has one planting receptacle 206 for every other row (or ring). In these cases, staggering the planting receptacles 206 allows the enclosed growing environment 100 to be able to monitor each individual plants 302 as well as allowing each individual plant 302 sufficient room to grow.

In some cases, the planting column 204 may be rotatable three-hundred and sixty degrees within the enclosure and about a base, or any other limited rotation. In some instances, as the planting column 204 rotates, each individual planting receptacle 206 may be assigned a unique identifier, such that a control system may track each plant 302 based on a determined location within the planting column 204 via sensor and/or image data captured by the sensors, discussed above. In these instances, the system may determine the assigned location of a plant upon insertion or planting within a specific planting receptacle 206. For example, a planting receptacle 206 may have a visible marking or invisible marking (e.g., an infrared spectrum mark that the control system may read upon insertion of a seed cartridge. In other cases, the control system may determine that a receptacle 206 has been filled as the planting column 204 rotates. In some cases, markings for location determination may also be placed at various positions about the interior surfaces of the enclosed growing environment and/or the top and bottom of the planting column 204 to assist with initialization or location determination upon restart or reboot of the system as well as in response to an upgrade or replacement lighting and control column being installed or calibrated.

As discussed herein, the seed cartridges may also include markings identifiable, such as via segmentation and/or classification of image data captured by the sensors of the enclosed growing environment 100. The markings may include plant identifiers as well as location of origin of the cartridge and/or the seeds, substrate, and the like associated therewith, fertilizer and/or substrate formulas, type of seeds (e.g., types of resulting plants species and any subspecies), number of seeds, media or substrate related data (e.g., manufacture, supplier, layers, layer make up, amount(s), and the like), compostability data, safety data (e.g., allergies and the like), certifications, lot number, dates (e.g., dates of manufacturing, production, seed and/or substrate packing, expiration, shipping, and the like), among others. The markings may assist the enclosed growing environment 100 in determining proper settings (such as lighting, watering, environmental conditions, and the like) for the cultivation of the identified plant.

Figure 4:
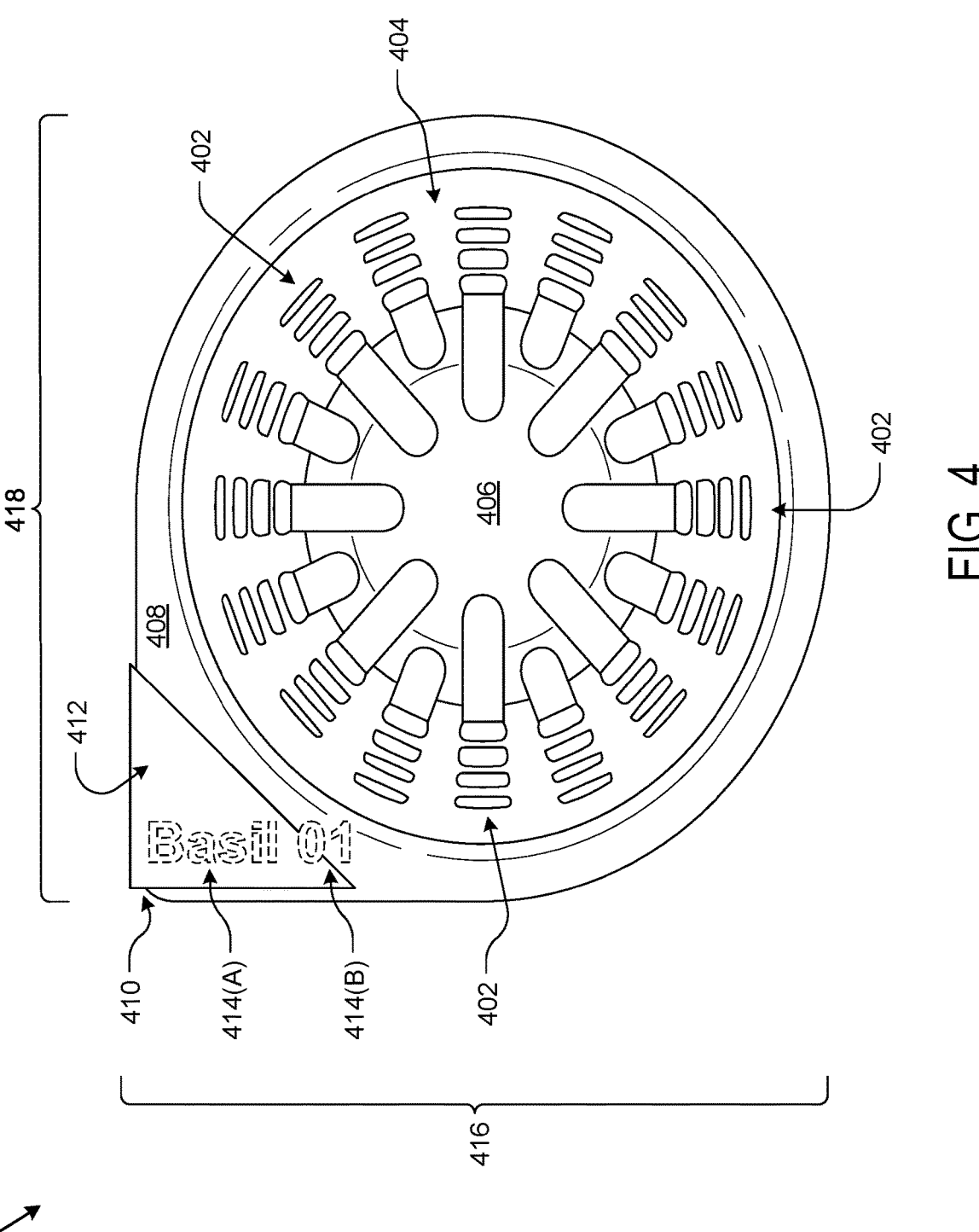
FIG. 4 is an example top down pictorial diagram of a seed cartridge with a cover or lid removed according to some implementations.

FIG. 4 is an example top down pictorial diagram of a seed cartridge 400 with a cover or lid removed according to some implementations. As discussed above the seed cartridge 402 may be configured to be inserted or otherwise placed within one or more receptacle of a planting column of an enclosed growing environment, as discussed above with respect to FIGS. 1-3. In this example, the lid or cover as well as the contents (e.g., substrate, grow medium, seeds, fertilize, and the like) have been removed. Accordingly, a plurality of openings, generally indicated as 402, are visible. The openings 402 may be concentrically arranged about a side surface 404 and/or bottom surface 406 of the seed cartridge 402.

The one or more openings 402 may allow water to be delivered to and drain from the seed cartridge 400. For example, the planting column may be configured to deliver desired amounts of water and/or nutrients to each seed cartridge 400 and/or each receptacle via a watering system of the enclosed growing environment. In this manner, the seeds (not shown) within the seed cartridge 400 receive custom or tailored water and/or nutrients based on the plant type, stage of growth, health, and the like, determined, for instance, via processing sensor data generated by the sensors of the enclosed growing environment.

In the current example, the openings 402 may be arranged in columns along the side surface and the columns may extend substantially the entire width of the exterior side surface, such that the openings 402 are located along substantially the entire width of the seed cartridge 400. In some examples, the size of the openings 402 may vary in size or length (as measured from a top surface 408 to the bottom surface 406 of the cartridge 400) with respect to each other. For instance, openings 402 physically closer to the bottom surface 406 may be longer relative to openings 402 positioned closer to the top surface 408 of the cartridge 400. The openings 402 physically closer to the bottom surface 406 may also be closer together (e.g., the distance between the openings 402 in adjacent columns is reduced) compared with the openings 402 positioned closer to the top surface 408 of the cartridge 400. For instance, the columns of openings 402 may also become closer to each other (e.g., the horizontal or width wise gaps between the openings 402 may be reduced) as the openings 402 approach the bottom surface (e.g., openings 402 proximate to the bottom surface 406 are closer horizontally and vertically to other openings 402 than slits proximate to the top surface 408). In some examples, the slits may continue along the bottom surface of the seed cartridge. For example, the lowest openings 402 in each column may partially extend into the bottom surface 406 of the seed cartridge 400 to provide improved drainage during use.

In the current example, the top surface 408 may include a tab or extended portion 410. The tab 410 may include markings, such as a color or pattern portion, generally illustrated as triangular section 412, and identifying characters 414. In some cases, the characters 414 may include language-based characters 414(A) usable by a user and/or the enclosed growing environment to identify and/or classify the seed cartridge 400. The characters 414(A) may, for example, be readable by users of the enclosed growing environment to identify plant name, species, type, and the like. The characters 414 may also include non-language-based characters 414(B) that may include symbols as well as alpha-numerical characters usable by the enclosed growing environment to identify additional data related to the seed cartilage 400, such as age, location or supplier of origin, plant sub-species, grow conditions, control settings, and the like. In some cases, the color or pattern portion 412 may be readable by the enclosed growing environment together with the language-based characters 414(A) and/or the non-language-based characters 414(B) to identify, classify, and/or determine features, characters, system settings, parameters, and the like for the specific plant associated with the seed cartridge 400.

In some examples, the markings 412 and/or 414 may include a hidden (such as an infrared marking) portion and a visible portion. For example, the visible portion may be used by a user to identify the plant (e.g., the language-based characters 414(A)) and the hidden portion may be usable by the vision system of the enclosed growing environment or via a manufacturer. In some cases, the hidden and visible portions may be along the same surface, such as the top surface 408 or tab 410, of the seed cartilage 400. However, in other examples, the hidden portion and the visible portion may be along different surface (e.g., a top surface 408 and an exterior of the bottom surface 406). In one example, the hidden portion may include an infrared or other machine readable but human unreadable spectrum on both the top surface and the bottom surface of the lid. For instance, the hidden portion may include a bar code, QR code, or other machine readable content. In some cases, the markings 412 and/or 414 (e.g., the hidden portion and/or visible portion) may be machine readable (such as via a barcode, QR code, RFID, NFC, or the like). In other cases, the markings may be configured to be readable using infrared (IR) or ultraviolet (UV) illumination, such that the information is invisible to a user under normal visible light conditions. In this example, the enclosed growing environment may be equipped with IR sensors and/or illuminators to extract the data associated with the markings.

In this example, by including the markings 412 and 414 on the tab 410 of the top surface 408, the markings 412 and 414 may remain visible to the vision system of the enclosed growing environment while the seed cartridge 400 is inserted into a receptacle of the planting column even when the lid is removed and/or discarded by the user or system operator.

In some cases, the seed cartridge 400 may also include a distance between parallel or opposing surfaces (such as in the illustrated example a diameter). In this example, the diameter may be between approximately six inches and nine inches. In other examples, the distance may be between surfaces such as when the seed cartridge 400 is square, hexagonal, octagonal, or the like. In the current example, as the seed cartridge 400 includes the tab 400, the seed cartridge 400 may have a first dimension 416 and a second dimension 418. In some example, the first dimension and/or the second dimension 418 may be between approximately four inches and eleven inches. In some example, the first dimension and/or the second dimension 418 may be between approximately six inches and eight inches.

Figure 5:
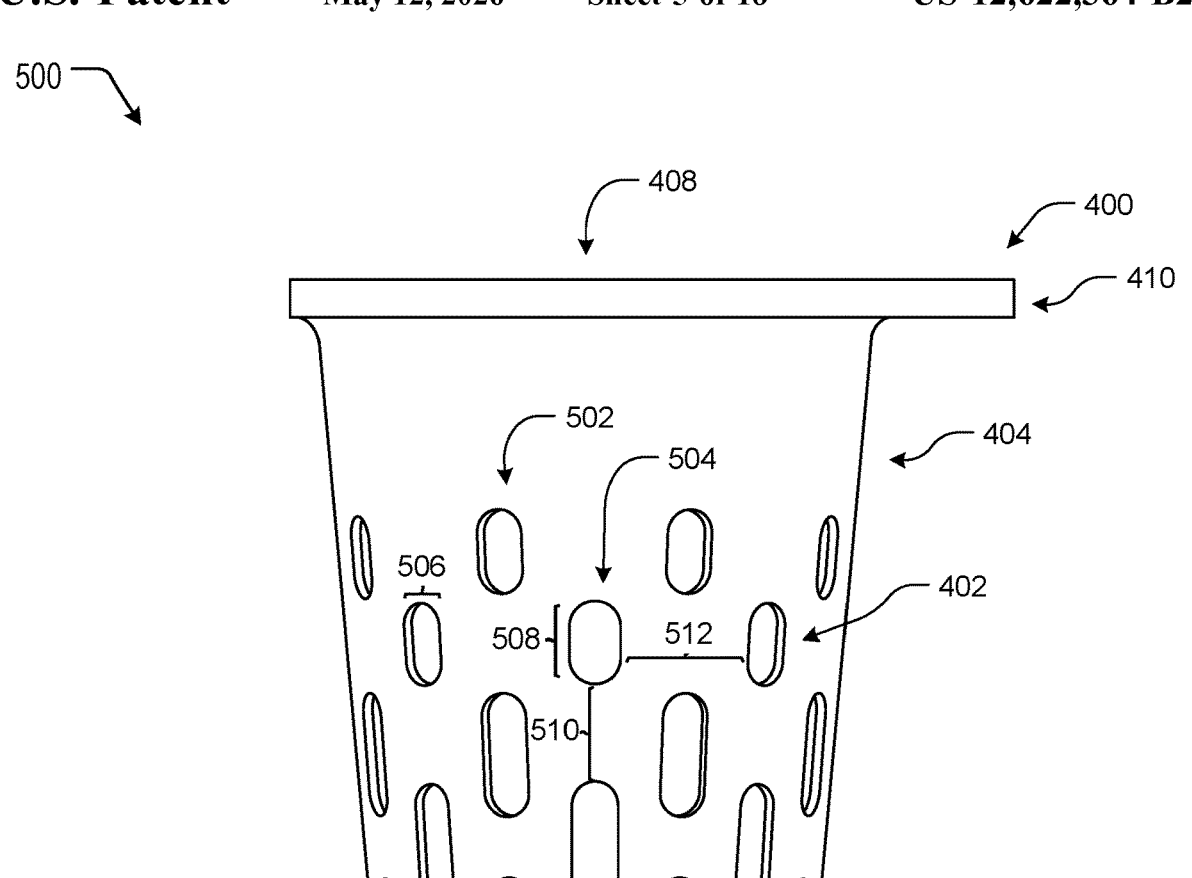
FIG. 5 is an example side view of a pictorial diagram of a seed cartridge with contents removed according to some implementations.

FIG. 5 is an example side view 500 of a pictorial diagram of a seed cartridge 400 with contents removed according to some implementations. In the current example, the seed cartridge 400 includes the plurality of openings 402 arranged in columns, such as column 502 and 504, along the side surface 404. In the current example, the openings 402 may be between approximately two millimeters and fourteen millimeters long and between approximately half a millimeter and 4 millimeters wide. The openings 402 within each individual column, such as column 502 and 504, may also vary in width 506, length 508, and/or distance 510 between adjacent openings 402, as illustrated. The distance 512 between adjacent openings 402 of different columns may also vary. For example, the openings 402 physically closer to the top surface 408 may have greater widths 508, distances 510, and/or distance 512 relative to openings 402 positioned closer to the bottom surface 406 of the cartridge 400. Additionally, the openings 402 physically closer to the bottom surface 406 may have greater length 508 relative to openings 402 positioned closer to the top surface 408 of the cartridge 400.

As an illustrated example, the length 508 of the openings 402 proximate to the bottom surface 406 may be greater than or equal to twice as long as the openings 402 proximate to the top surface 408. In another example, the length 508 of the openings 402 proximate to the bottom surface 406 may be greater than or equal to thrice as long as the openings 402 proximate to the top surface 408. Similarly, the distance 510 and/or the distance 512 between openings 402 proximate to the top surface 408 may be greater than or equal to twice as long as the openings 402 proximate to the bottom surface 406. In another example, the distance 510 and/or the distance 512 between openings 402 proximate to the top surface 408 may be greater than or equal to thrice as long as the openings 402 proximate to the bottom surface 406.

In the current example, the columns 502 and/or 504 of the openings 402 may extend substantially the entire width of the exterior side surface 402, such that the openings 402 are located along substantially the entire width of the seed cartridge 400. The columns 502 and/or 504 of the openings 402 may also extend for a portion of the length of the exterior side surface 402, such as approximately three-fourths of the side surface 402 of the seed cartridge 400. In other examples, the columns 502 and/or 504 may extend for a portion of the length of the exterior side surface 402 equal to approximately two-thirds, one-half, or the of the side surface 402 of the seed cartridge 400.

Figure 6:
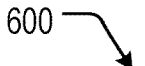
FIG. 6 is an example pictorial diagram of a seed cartridge according to some implementations.
Figure 6:
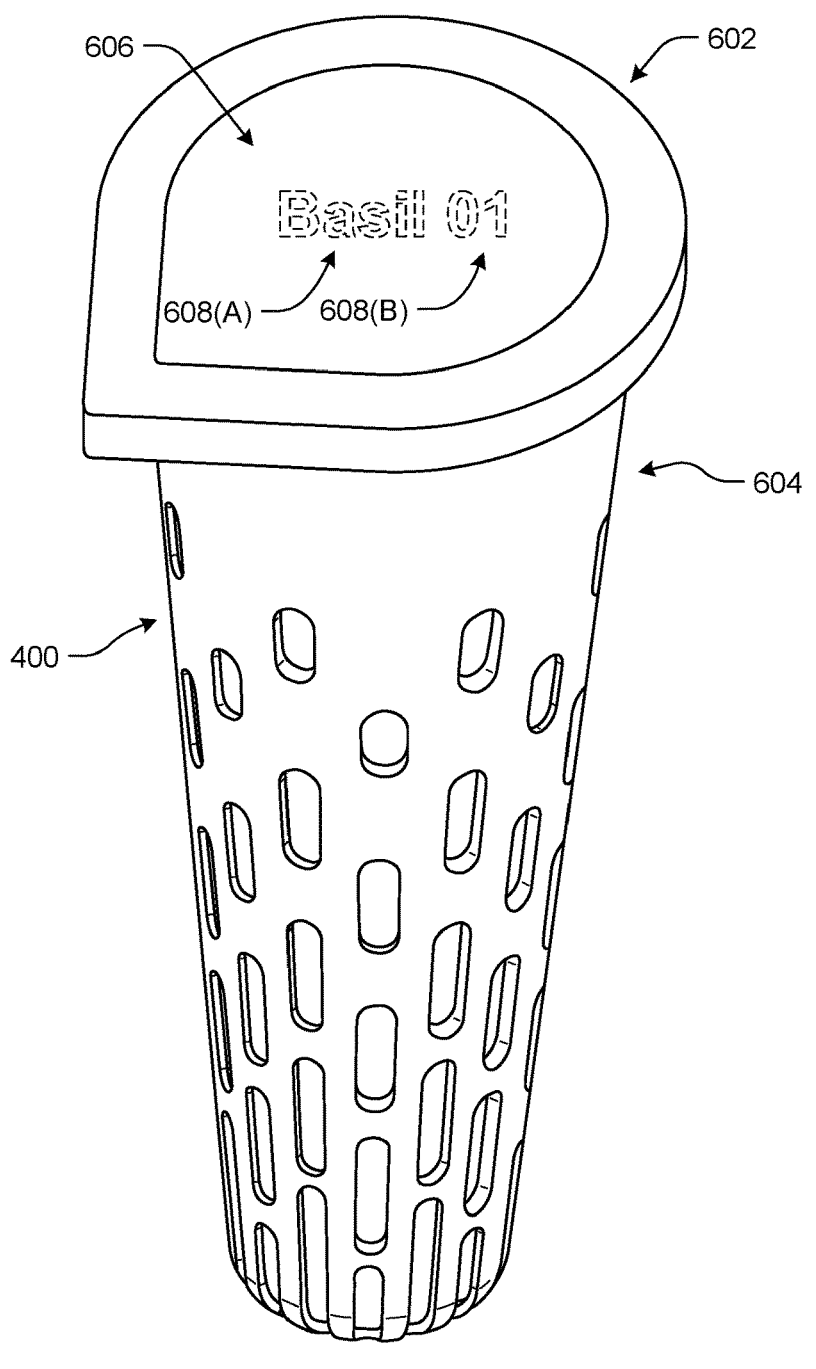

FIG. 6 is an example pictorial diagram 600 of a seed cartridge 400 according to some implementations. In the current example, the seed cartridge 400 includes an attached lid or cover 602 in a closed position. The lid 602 may be configured to transition between an open position and a closed position. In some cases, the lid 602 may be removable from a body 604 of the seed cartridge 400 in the open position. In other examples, the lid 602 may remain attached to the body 604 in the open position.

In the current example, the lid 602 may include markings, such as a color or pattern portion, generally illustrated as section 606, and identifying characters 608. In some cases, the characters 608 may include language-based characters 608(A) usable by a user and/or the enclosed growing environment to identify and/or classify the seed cartridge 400. The characters 608(A) may, for example, be readable by users of the enclosed growing environment to identify plant name, species, type, and the like. The characters 608 may also include non-language-based characters 608(B) that may include symbols as well as alpha-numerical characters usable by the enclosed growing environment to identify additional data related to the seed cartilage 400, such as age, location or supplier of origin, plant sub-species, grow conditions, control settings, and the like. In some cases, the color or pattern portion 606 may be readable by the enclosed growing environment together with the language-based characters 608(A) and/or the non-language-based characters 608(B) to identify, classify, and/or determine features, characters, system settings, parameters, and the like for the specific plant associated with the seed cartridge 400.

In some examples, the markings 606 and/or 608 may include a hidden (such as an infrared marking) portion and a visible portion. For example, the visible portion may be used by a user to identify the plant (e.g., the language-based characters 608(A)) and the hidden portion may be usable by the vision system of the enclosed growing environment or via a manufacturer. In one example, the hidden portion may include an infrared or other machine readable but human unreadable spectrum on both the top surface and the bottom surface of the lid. For instance, the hidden portion may include a bar code, QR code, or other machine readable content. In some cases, the markings 606 and/or 608 (e.g., the hidden portion and/or visible portion) may be machine readable (such as via a barcode, QR code, RFID, NFC, or the like). In other cases, the markings may be configured to be readable using infrared (IR) or ultraviolet (UV) illumination, such that the information is invisible to a user under normal visible light conditions. In this example, the enclosed growing environment may be equipped with IR sensors and/or illuminators to extract the data associated with the markings.

Figure 7:
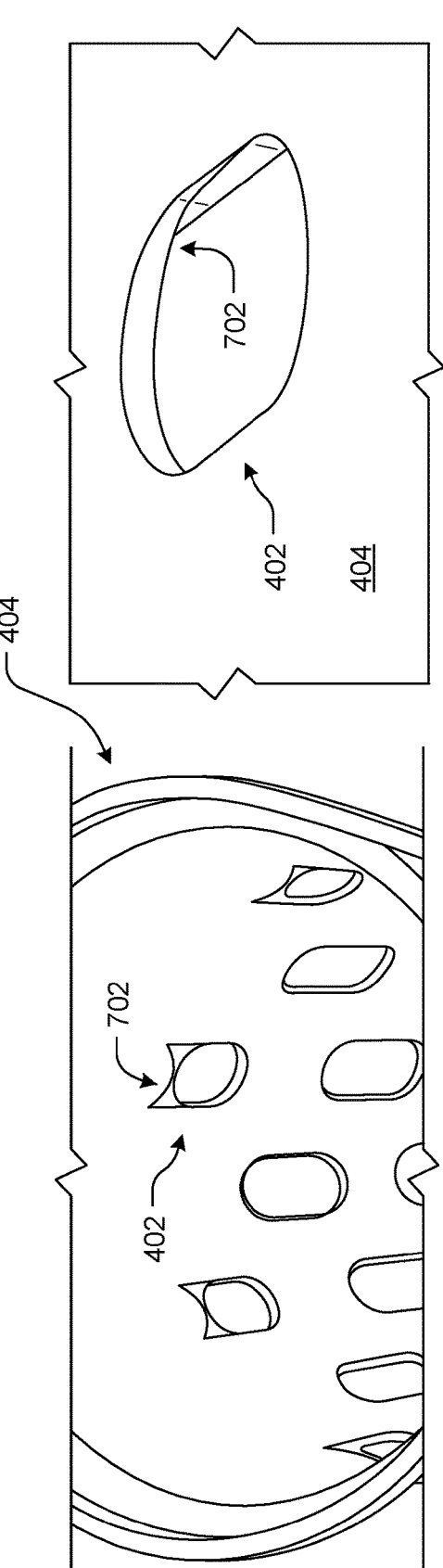
FIG. 7 is an example diagram of the openings within the exterior surface of the seed cartridge according to some implementations.

FIG. 7 is an example diagram 700 of the opening 402 within the exterior surface of the seed cartridge 400 according to some implementations. In the current example, the openings 402 may be a first dimension, shape, and/or configuration along an exterior portion of the surface 404 and a second dimension, shape, and/or configuration along an interior portion of the surface 404. In this manner, the surface 404 of the seed cartridge 400 may have two layers. In some cases, the second dimension, shape, and/or configuration may be larger or having additional extensions that exceed the first dimension, shape, and/or configuration of the openings 402 (e.g., the opening 402 is larger on the interior of the surface 404 than on the exterior of the surface 404). In the current example, the openings 402 may include extensions, generally indicated by 702, on the interior of the surface 404 to assist with manufacturing, reduce weight and/or materials costs associated with the seed cartridge 400.

Figure 8:
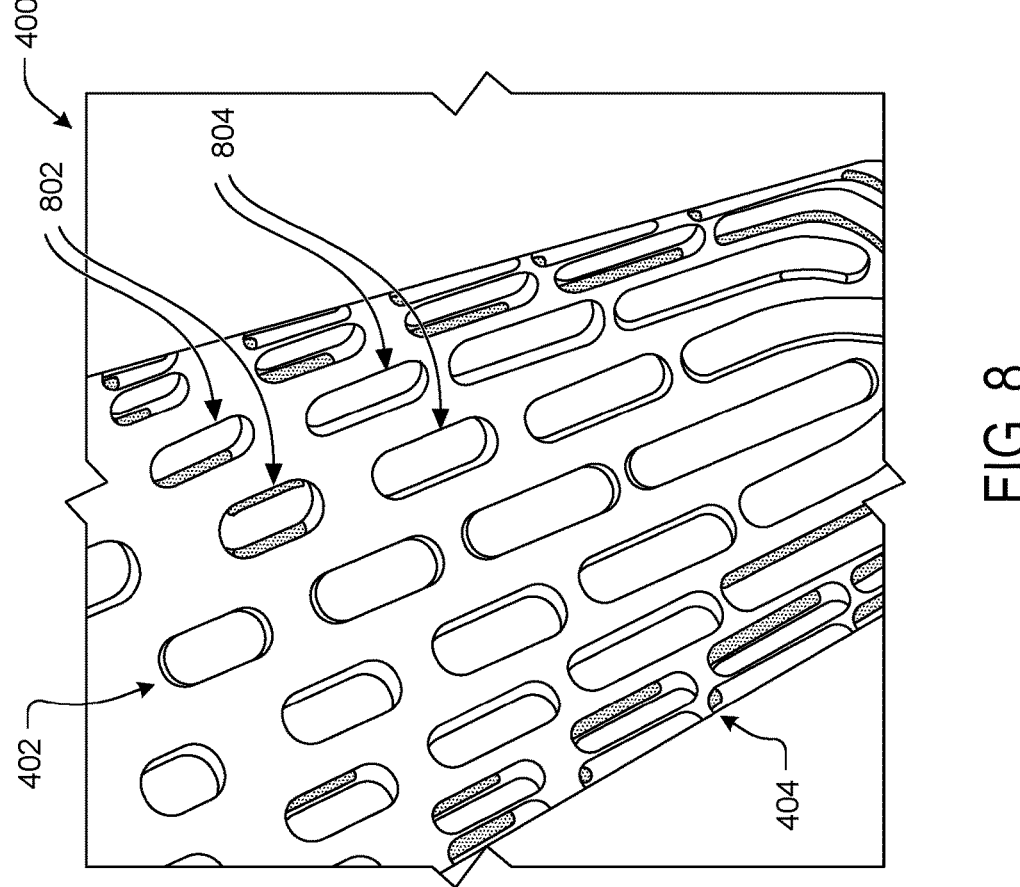
FIG. 8 is an example diagram of the openings within the exterior surface of the seed cartridge according to some implementations.
Figure 8:

FIG. 8 is an example diagram 800 of the openings 402 within the exterior surface 404 of the seed cartridge 400 according to some implementations. In the current example, the thickness or depth of the openings 402 and/or surface 404 of the seed cartridge 400 is illustrated. For example, the seed cartridge 400 may have a variable thickness that may decrease from the top surface of the seed cartridge 400 to the bottom surface of the seed cartridge 400. For instance, in the current example, the openings 402 and/or the surface 404 may have a thickness of between approximately 0.2 millimeters and 0.6 millimeters at the position and/or openings 402 indicated by 802 and between approximately 0.1 millimeters and 0.5 millimeters at the position and/or openings 402 indicated by 804. As another example, the thickness of the openings 402 and/or surface 404 may be between approximately 0.3 millimeters and 0.5 millimeters at the position and/or openings 402 indicated by 802 and approximately 0.2 millimeters and 0.4 millimeters at the position and/or openings 402 indicated by 804.

Figure 9:
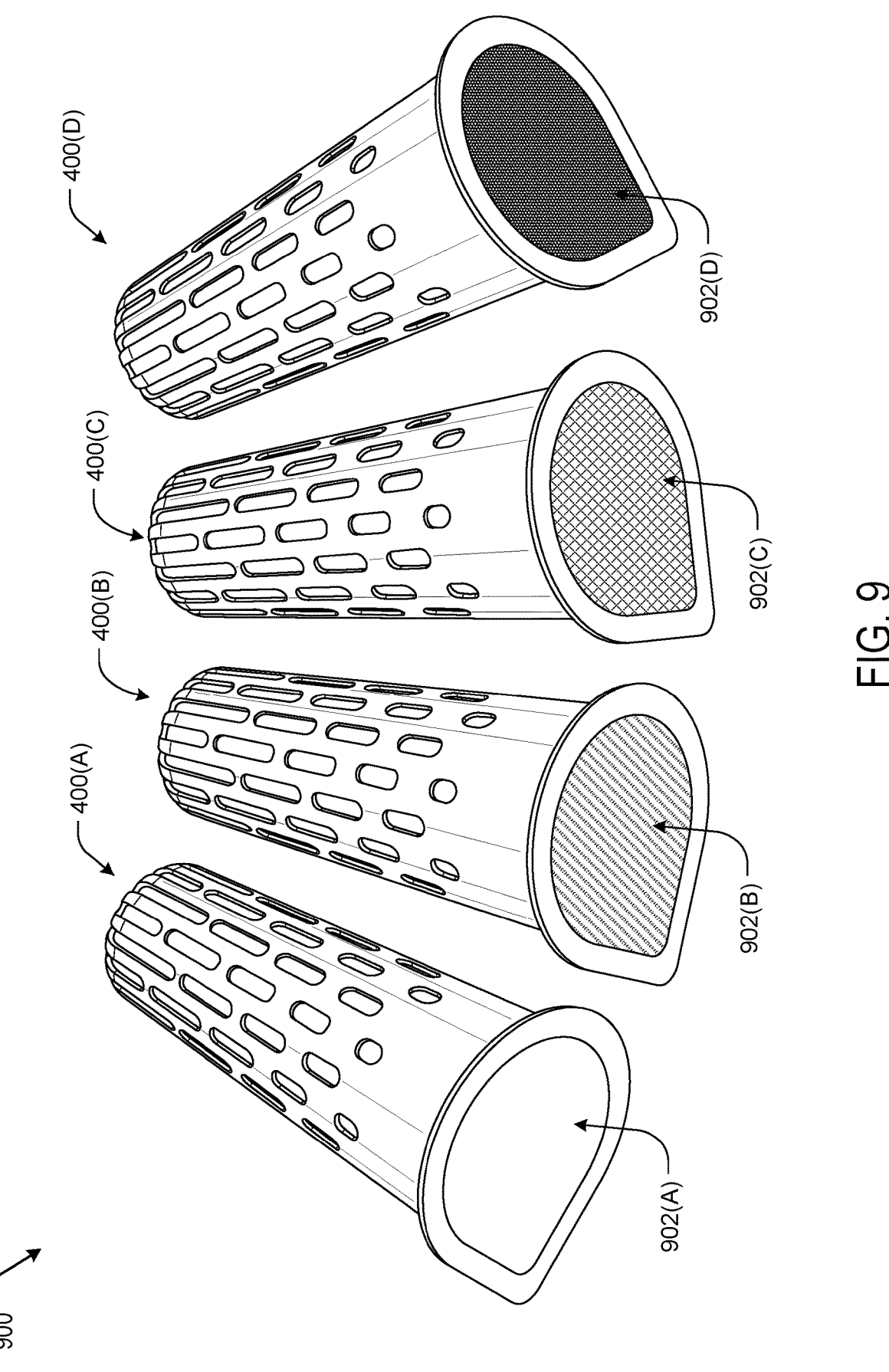
FIG. 9 is an example pictorial diagram of multiple seed cartridges having differing markings according to some implementations.

FIG. 9 is an example pictorial diagram 900 of multiple seed cartridges 400 having differing markings 902 according to some implementations. As illustrated, each seed cartridge 400 may be identical in form, dimension, size, shape, and the like but include different markings 902 to assist both a user and a vision system of the enclosed growing environment 100 of FIGS. 1-3 in determining features, characteristics, and the like of the plant or seed encapsulated in the respective seed cartridge 400. For example, the markings 902 may include a hidden (such as an infrared marking) and/or visible portion(s). For example, the visible portion may be used by a user to identify the plant and the hidden portion may be usable by the vision system of the appliance or via a manufacturer. In some cases, the hidden and visible portions may be along the same surface of the lid. In one example, the hidden portion may include an infrared or other machine readable but human unreadable spectrum on both the top surface and the bottom surface of the lid. For instance, the hidden portion may include a bar code, QR code, or other machine readable content. In some cases, the markings (e.g., the hidden portion and/or visible portion) may be machine readable (such as via a barcode, QR code, RFID, NFC, or the like). In other cases, the markings may be configured to be readable using infrared (IR) or ultraviolet (UV) illumination, such that the information is invisible to a user under normal visible light conditions. In this example, the enclosed growing environment may be equipped with IR sensors and/or illuminators to extract the data associated with the markings.

FIG. 10 is an example pictorial diagram 1000 of example filters 1002 for the interior of the seed cartridges, such as the seed cartridge 400 of FIGS. 4-9, according to some implementations. In the current example, the filters 1002 may be configured to be received within the interior of the seed cartridge 400 and filled with substrate, growth material, seeds, fertilizer, and the like. In some cases, the filter 1002 may be utilized in conjunction with the seed cartridge 400 to prevent roots and other plant components from growing out of the opening, such as openings 402 of FIGS. 4-9, and into the watering system or planting column 204 of the enclosed growing environment 100 of FIGS. 1-3. Additionally, the filters 1002 may prevent the substrate, growth material, seeds, fertilizer, and the like from inadvertently dispensing from the seed cartridge 400 into the enclosed growing environment 100.

In some cases, the filters 1002 may be formed from materials, such as metal mesh, cloths, fabrics, and the like. In the current example, the filter 1002(A) includes a cover 1004 that may be movably jointed or coupled to the body 1006 of the filter 1002(A). In this manner, as the seed sprouts and the plant emerges from the seed cartridge 400, the cover

1004 may be lifted and moved by the vegetation allowing the plant to fully mature in an unrestricted or inhibited way. The body 1006 of the filters 1002 may also include a bottom 1008 and a side surface 1010 to assist in retaining the substrate, grow material, seeds, fertilizer, and the like.

Figure 11:
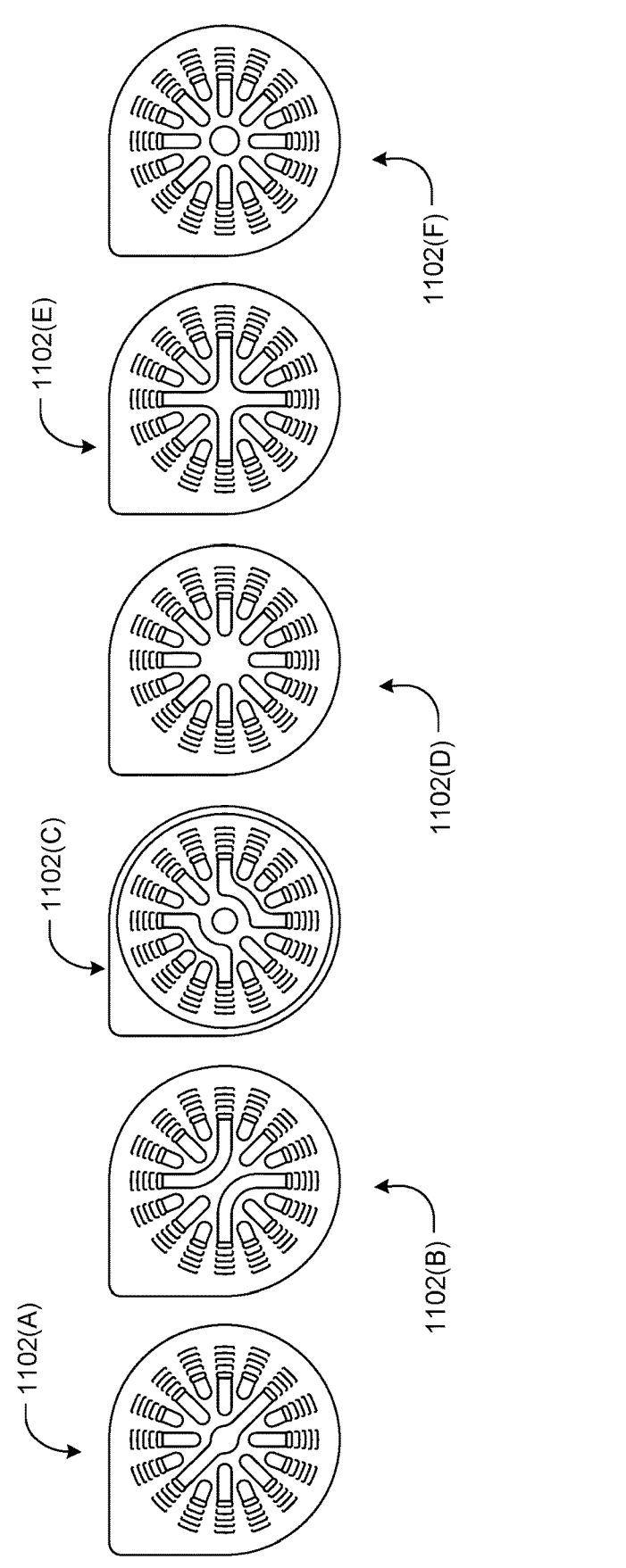
FIG. 11 illustrates example pictorial diagrams of top surfaces of the seed cartridge according to some implementations.
Figure 12:
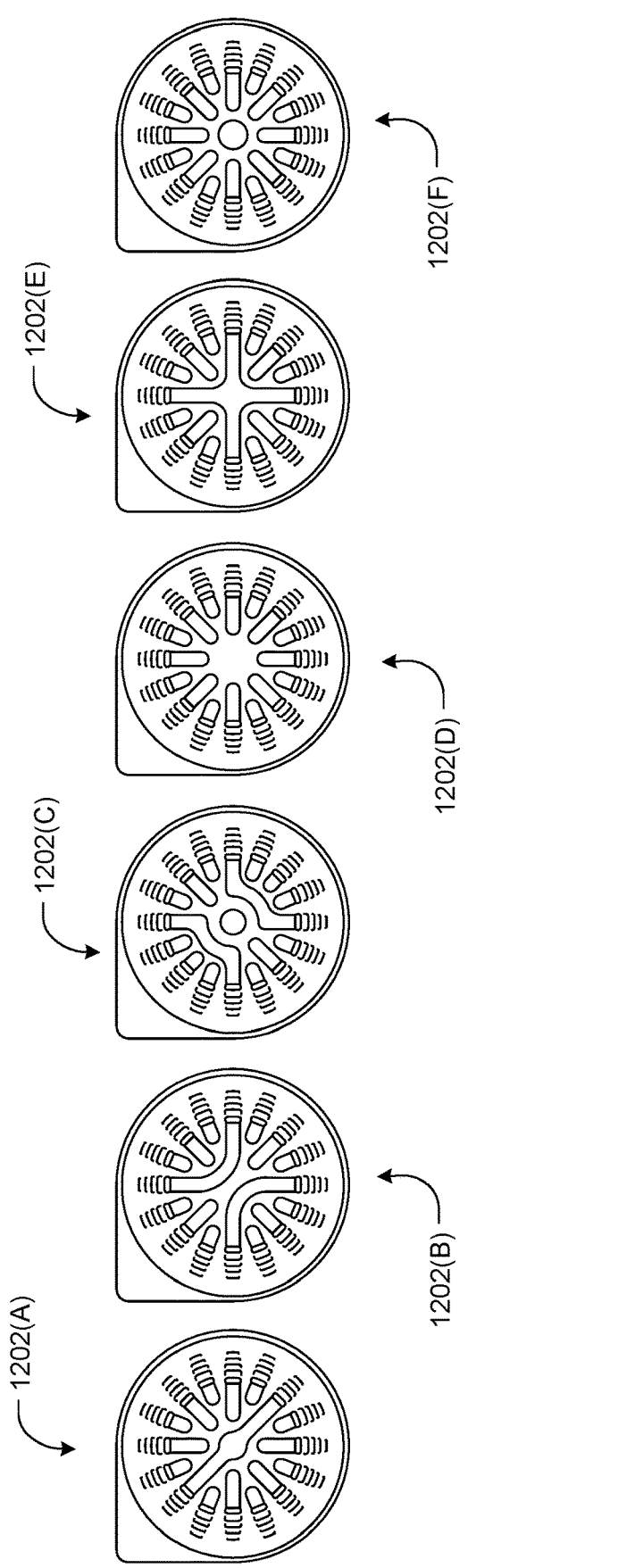
FIG. 12 illustrates example pictorial diagrams of bottom surfaces of the seed cartridge according to some implementations.
Figure 13:
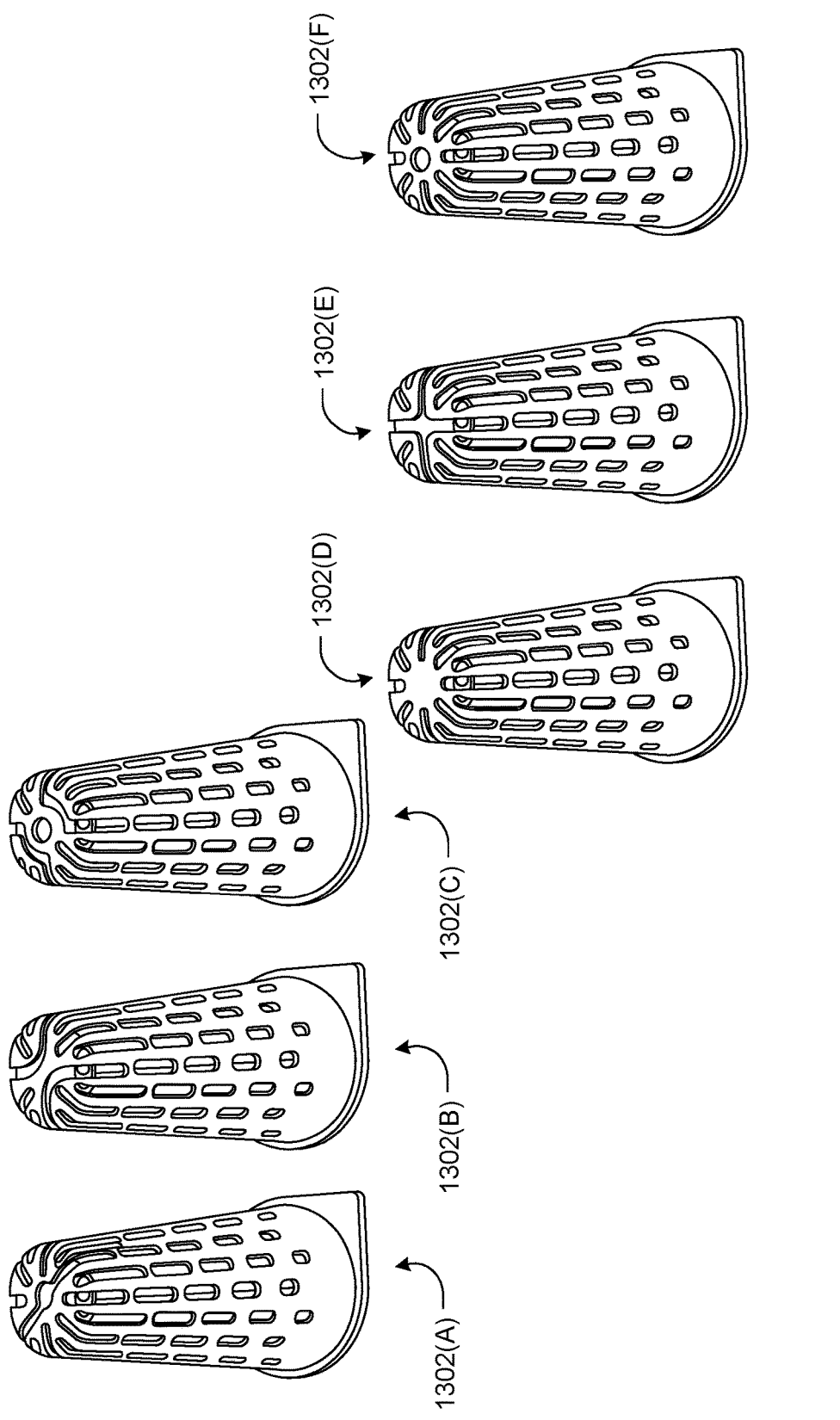
FIG. 13 illustrates example pictorial diagrams of the seed cartridge according to some implementations.

FIGS. 11-13 illustrates example views of pictorial diagrams 1100 of example opening arrangements 1102 for various seed cartridges, such as the seed cartridge 400 of FIGS. 3-9, according to some implementations. In the current examples, FIG. 11 illustrates a bottom view of the seed cartridges, FIG. 12 illustrates a top view of the seed cartridges, and FIG. 13 illustrates perspective views, from the bottom, of the seed cartridges. In the current example, each opening arrangement 1102 illustrates a design for the openings 402. However, it should be understood that the arrangements 1102(A)-(F) are example arrangements for illustration purposes and that other opening arrangements may be utilized with respect to the enclosed growing environment 100 of FIGS. 1-3 and the seed cartage 400 of FIGS. 3-9.

Figure 14:
FIG. 14 illustrates example pictorial diagrams of a mold associated with the seed cartridge according to some implementations.
Figure 15:
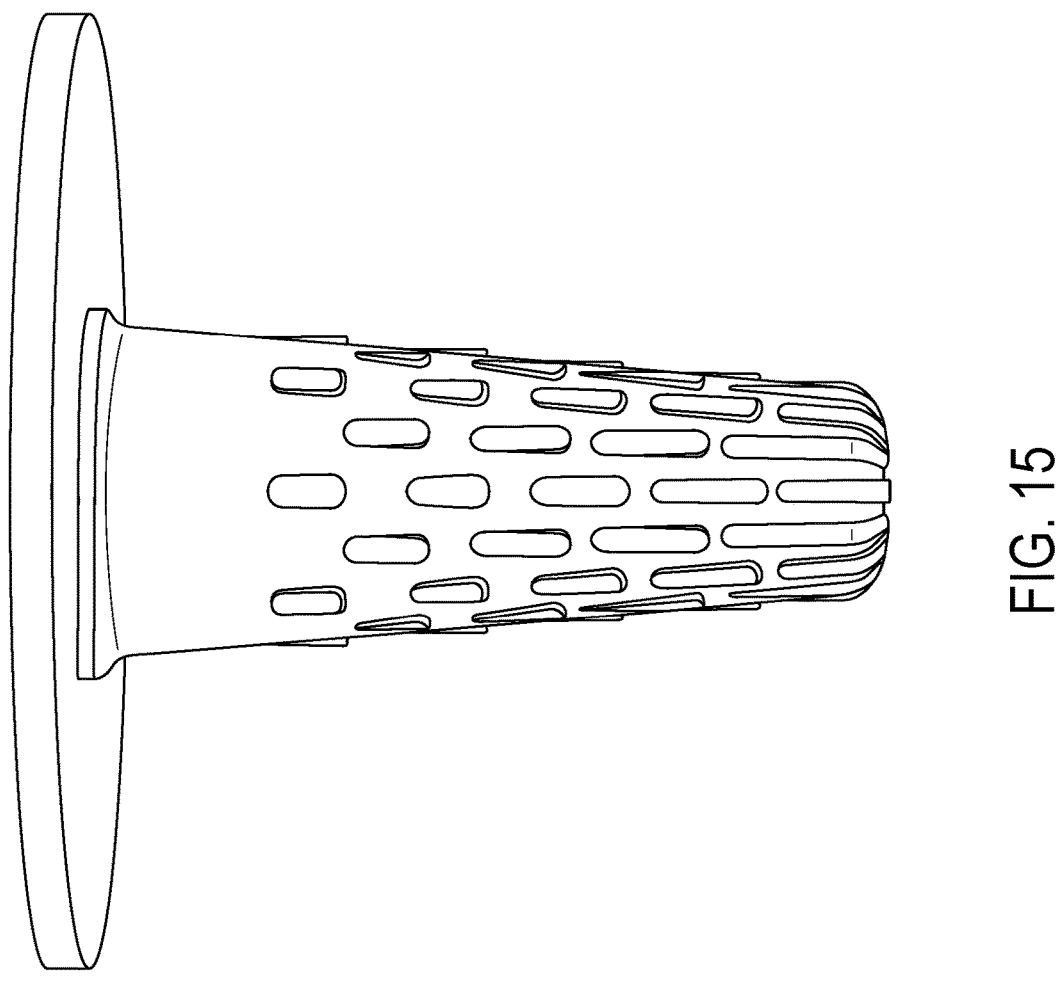
FIG. 15 illustrates example pictorial diagrams of a mold associated with the seed cartridge according to some implementations.
Figure 16:
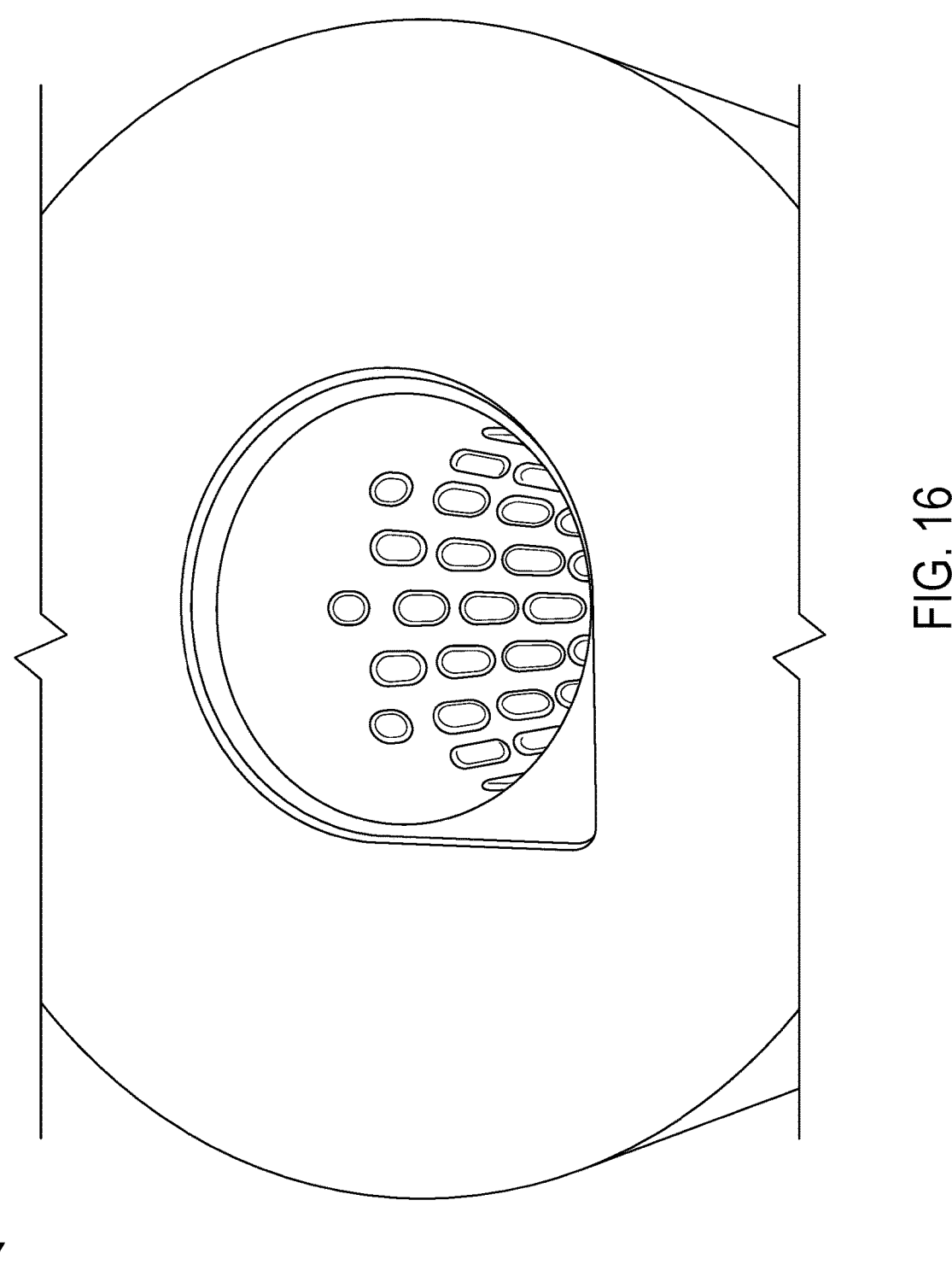
FIG. 16 illustrates example pictorial diagrams of a mold associated with the seed cartridge according to some implementations.

FIGS. 14-16 illustrates example pictorial diagrams of molds, such as an exterior mold 1400, interior mold 1500, and exterior mold 1600, associated with the seed cartridge 400. For example, the molds 1400-1600 may be utilized to form and manufacture the seed cartridges 400 of FIGS. 3-9.

FIG. 17 illustrates example pictorial diagrams 1700 of a ring or row 1702 of a planting column 1704 that may be utilized with the enclosed growing environment 100 or as standalone system according to some implementations. For example, the ring 1702 may form one row of the planting column 204 of the enclosed growing environment 100 illustrated with respect to FIGS. 2 and 3 or a standalone, countertop, or tabletop planting columns discussed below with respect to FIG. 18. For instance, the planting column may be formed by stacking identical rings 1702 one atop the next. In this manner, a user may form a planting column having a desired number of rows and, accordingly, planting receptacles.

In the current example, the ring 1702 includes male connector, generally indicated by 1704, and a female connector, generally indicated by 1706. In some case, the male connectors 1704 and the female connectors 1706 may be offset from each other such that when the rings 1702 are engaged with each other the planting receptacles are offset or have alternating positions from one row or ring to the next. In this manner, the planting column formed from the set of rings 1702 may provide sufficient space for each plant to grow to maturity.

The ring 1702 may also include receptacles, generally indicated by 1708, for receiving and maintaining the seed cartridges. In some cases, each ring 1702 may include between eight and twelve receptacles. In other examples, the ring 1702 may include between four and fifteen receptacles. As illustrated, the ring 1702 includes ten receptacles. The ring 1702 may also include between two and eight male connectors 1704 and female connectors 1706. In other examples, the ring 1702 may include between three and seven male connectors 1704 and female connectors 1706. As illustrated, the ring 1702 includes five male connectors 1704 and female connectors 1706.

FIG. 18 illustrates another example pictorial diagrams 1800 of a planting column 1802 having engaged seed cartridges, generally indicated by 400, that may be utilized with the enclosed growing environment 100 or as standalone system according to some implementations. As discussed above with respect to FIG. 17, the planting column 1802 may be formed from a plurality of rings 1702, generally indicated by 1702, stacked one atop the next via male and female connectors. In some cases, the planting column 1802 may be configured to engage with a rotational plate or base of the enclosed growing environment 100 of FIGS. 1-3. In other cases, the planting column 1802 may be configured to be placed, with or without a base (not shown), on a counter, tabletop, or the like.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A cartridge comprising:
a body having a bottom surface and a side surface defining a cavity, the side surface and bottom surface including a plurality of openings and wherein:
the plurality of openings are arranged in at least a first column and a second column;
a first opening of the first column positioned closer to the bottom surface of the body than a second opening of the first column;
the second opening of the first column positioned below the first opening of the first column, a third opening of the first column positioned below the second opening, and wherein a length of the second opening of the first column is greater than a length of the first opening of the first column and a length of the third opening of the first column is greater than the length of the second opening of the third column; and
a lid releasably coupled to the body.

2. The cartridge of claim 1, wherein the lid includes at least one marking indicating at least one of:
a characteristic of the cartridge;
a characteristic of contents of the cartridge;
an entity associated with the cartridge; or
a location or address associated with the cartridge or the contents of the cartridge.

3. The cartridge of claim 1, wherein the at least one marking is machine readable and user readable.

4. The cartridge of claim 1, wherein the body defines a top surface and the top surface includes at least one marking indicating at least one of:
a characteristic of the cartridge;
a characteristic of contents of the cartridge; or
a location associated with the cartridge or the contents of the cartridge.

5. The cartridge of claim 4, wherein:
the top surface includes a tab extending outward from the cavity and the at least one marking is located on the tab; and
the first opening having a greater vertical length than the second opening.

6. The cartridge of any of claim 1, wherein:
the first opening of the plurality of openings arranged in the first column having a center that is horizontally aligned with a midpoint between a center of a third opening of the plurality of openings arranged in the second column and a center of a fourth opening of the plurality of openings arranged in the second column; and
the third opening is vertically adjacent to the fourth opening in the second column.

7. The cartridge of claim 1, wherein the lid remains attached to the body when the cartridge is in an open position.

8. The cartridge of claim 1, wherein the lid detaches from the body when the cartridge is in an open position.

9. The cartridge of claim 1, further comprising:
a filter received within the cavity defined by the side surface and the bottom surface, the filter encapsulating a seed and a substrate.

10. The cartridge of claim 1, wherein the cartridge is configured to be received within a growing receptacle of a planting column of an enclosed growing environment.

11. The cartridge of claim 10, wherein the planting column is formed from a plurality of rings, individual rings of the planting column having a male connector and a female connector to engage with an adjacent ring of the planting column.

12. A system comprising:
a seed cartridge having a side surface and a bottom surface defining a cavity and including a plurality of openings, the cavity containing seeds and growth medium; and
a planting column having a plurality of receptacles, a first receptacle of the plurality of receptacles configured to receive the seed cartridge and the planting column is formed from a plurality of rings, individual rings of the planting column having a male connector and a female connector to engage with an adjacent ring of the planting column and the planting column further comprises at least one gasket between each adjacent pair of the plurality of rings.

13. The system of claim 12, wherein the seed cartridge includes at least one marking on an exterior surface.

14. The system of claim 12, further comprising:
an enclosed growing environment including the planting column and further comprising:
a rotational base to couple to the planting column;
a watering system to provide at least one of water or nutrients to the seed cartridge;
at least one sensor for generating sensor data associated with the planting column;
at least one illuminator for generating light within an enclosure of the enclosed growing environment; and
a control system to determine at least one feature of the seed cartridge based at least in part on the sensor data.

15. The system of claim 12, wherein the seed cartridge further comprises:
a first opening of the plurality of openings arranged in a first column having a center that is horizontally aligned with a vertical midpoint between a center of a second opening of the plurality of openings arranged in a second column and a center of a third opening of the plurality of openings arranged in the second column, and wherein:
the third opening being vertically adjacent to the second opening in the second column;
the third opening of the second column positioned closer to the bottom surface of the seed cartridge than the second opening of the second column; and
the third opening has a greater vertical length than the second opening.

16. A system comprising:
a seed cartridge having a side surface and a bottom surface defining a cavity and including a plurality of openings, the cavity containing seeds and growth medium and wherein the plurality of openings are arranged in at least a first column and a second column and a first opening of the first column positioned closer to the bottom surface than a second opening of the first column; and an enclosed growing environment comprising:

a planting column having a plurality of receptacles and formed from a plurality of rings, a first receptacle of the plurality of receptacles configured to receive the seed cartridge and individual rings of the planting column having a male connector and a female connector to engage with an adjacent ring of the planting column;

a rotational base to couple to the planting column;

a watering system to provide at least one of water or nutrients to the seed cartridge;

at least one sensor for generating sensor data associated with the planting column;

at least one illuminator for generating light within an enclosure of the enclosed growing environment; and a control system to determine at least one feature of the seed cartridge based at least in part on the sensor data.

17. The system of claim 16, wherein the seed cartridge includes at least one marking on an exterior surface.

18. The system of claim 17, wherein the at least one marking indicating at least one of:

a characteristic of the cartridge;

a characteristic of contents of the cartridge; or a location associated with the cartridge or the contents of the cartridge.

19. The system of claim 16, wherein:

the planting column further comprises at least one gasket between each adjacent pair of the plurality of rings.

20. The system of claim 16, wherein the seed cartridge further comprises a lid releasably coupled to the side surface.

* * * * *